Patented Dec. 15, 1931

1,836,474

UNITED STATES PATENT OFFICE

EMIL KEUNECKE, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF METAL CARBONYLS

No Drawing. Application filed August 12, 1929, Serial No. 385,480, and in Germany August 14, 1928.

The present invention relates to a process of producing metal carbonyls by the action of carbon monoxide upon materials containing the corresponding metals.

A process of producing metal carbonyls by acting with carbon monoxide or gases containing the same on metals capable of forming metal carbonyls suspended in or made into a paste with liquids or melts inert against the said metals and capable of dissolving carbon monoxide, though only to a low degree, while keeping the liquid and the metals in motion against each other, has been described in the application Ser. No. 374,938 filed June 29th, 1929. The said process exhibits inter alia the advantage that the solid initial materials can readily be introduced into and removed from the reaction vessel which is of particular importance when pulverulent initial materials are employed. Moreover, the said process facilitates the tightening of the apparatus. When carrying out the said process liquids are preferably to be employed which are good solvents for carbon monoxide, since otherwise the speed of the reaction is reduced, and the carbon monoxide is preferably to be applied under high pressure which increases the amount of carbon monoxide dissolved in the liquid.

I have now found that metal carbonyls can advantageously be produced without making use of liquids or melts having a good solvent action for carbon monoxide and in a manner less dependent from the application of the carbon monoxide under high pressure, by suspending the initial material containing the metals to be converted into their carbonyls in an inert liquid or in making it into a paste therewith, introducing the said suspension or paste into the reaction vessel, and acting on the material containing the said metals with carbon monoxide after vaporizing the liquid at least to such a degree that the material under treatment is not covered with a coherent film of the liquid which would hinder the reaction. Therefore, care is to be taken by the application of suitable temperatures or by adjustment of the speed of the current of carbon monoxide that in the reaction chamber the partial pressure of the liquid, in particular of the metal carbonyls, where such are used, is kept below or at the most equal to the vapour pressure of the liquid at the working temperatures.

Any liquids or melts which are inert against the initial material may be used, preferably such having a high vapour tension, for example easily volatile hydrocarbons, such as xylene, benzine, benzene, gasoline or petrol and the like. It is of particular advantage, however, to employ the carbonyls of the metals which are to be converted into carbonyls, for example liquid nickel or iron carbonyl or molten cobalt carbonyl or, if desired, mixtures of the same, as agents for forming the paste of the initial materials. In this manner the contamination of the reaction products is prevented and the separation of the same from the foreign additional substances is dispensed with.

The volatilization of the added liquid can be carried out in the reaction chamber itself, or in another part of the apparatus inserted in front of the reaction chamber, which, for example, is kept at a temperature higher than that of the reaction chamber; in the latter case it is preferable to introduce the carbon monoxide or gas containing the same in counter-current to the reaction material. If the reaction material is moved through the reaction chamber together with the reaction gas in the same direction, the temperature of the front chamber is chosen so that the added liquid is already partially or wholly vaporized therein, in which case it can be condensed and drawn off through a cooling device, for example built in at the side of the apparatus, if desired. The vapour of the liquid can, however, be taken along with the effluent gases, and then can be partially or wholly condensed on the residue still present after the reaction. This can then again be converted into a paste or suspension, and in this form can be readily removed from the apparatus. Morever, the reaction residue can be made into a paste in the desired manner by pressing in liquid, volatile or non-volatile substances at a suitable place in the apparatus.

The following example will further illustrate the nature of the said invention, but the invention is not restricted to this example. The parts are by weight.

*Example*

1 part of reduced powdered roasted pyrites is made into a paste with 1 part of iron carbonyl and the paste is then pressed into a vessel withstanding high pressure. The paste is heated to 200° C. and carbon monoxide is then passed in with such a velocity at 200 atmospheres pressure that the partial pressure of the carbonyl in the effluent gas does not reach the vapour pressure of iron carbonyl at 200° C. (about 8 atmospheres). In this manner the iron carbonyl is evaporated and simultaneously and subsequently in 3 hours 87 per cent of the iron is converted into carbonyl. The cooled residue is again made into a paste by pressing in liquid iron carbonyl, and is pressed out from the vessel in this form.

What I claim is:—

1. The process of producing metal carbonyl, which comprises mixing a material containing a metal capable of forming metal carbonyl with a volatile inert liquid to form a suspension or paste, introducing the said mixture into a reaction chamber, vaporizing the liquid at least to such a degree that the said material is not covered with a coherent film of the liquid, and acting on the said material with a gas containing carbon monoxide.

2. The process of producing metal carbonyl, which comprises mixing a material containing a metal capable of forming metal carbonyl with a volatile inert liquid to form a suspension or paste, introducing the said mixture into a reaction chamber, vaporizing the liquid and acting on the said material with a gas containing carbon monoxide.

3. The process of producing metal carbonyl, which comprises mixing a material containing a metal capable of forming metal carbonyl with a volatile inert liquid to form a suspension or paste, introducing the said mixture into a reaction chamber, vaporizing the liquid, acting on the said material with a gas containing carbon monoxide, mixing the solid reaction residue with an inert liquid and removing the mixture from the reaction chamber.

4. The process of producing metal carbonyl, which comprises mixing a material containing a metal capable of forming metal carbonyl with a volatile inert liquid to form a suspension or paste, introducing the said mixture into a reaction chamber, vaporizing the liquid, and acting on the said material with a gas containing carbon monoxide under increased pressure.

5. The process of producing metal carbonyl, which comprises mixing a material containing a metal capable of forming metal carbonyl with a volatile inert liquid to form a suspension or paste, introducing the said mixture into a reaction chamber, vaporizing the liquid, acting on the said material with a gas containing carbon monoxide under increased pressure, mixing the solid reaction residue with an inert liquid and removing the mixture from the reaction chamber.

6. The process of producing metal carbonyl, which comprises mixing a material containing a metal capable of forming metal carbonyl with the carbonyl to be produced to form a suspension or paste, introducing the said mixture into a reaction chamber, vaporizing the metal carbonyl, and acting on the said material with a gas containing carbon monoxide.

In testimony whereof I have hereunto set my hand.

EMIL KEUNECKE